United States Patent
Aldover et al.

(10) Patent No.: US 10,659,514 B2
(45) Date of Patent: May 19, 2020

(54) SYSTEM FOR VIDEO MONITORING WITH ADAPTIVE BITRATE TO SUSTAIN IMAGE QUALITY

(71) Applicant: Netgear, Inc., San Jose, CA (US)

(72) Inventors: Dennis Aldover, Carlsbad, CA (US); John Thomas, Carlsbad, CA (US); Aditya Deore, San Diego, CA (US); Ron Hokanson, Oceanside, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 85 days.

(21) Appl. No.: 15/938,378

(22) Filed: Mar. 28, 2018

(65) Prior Publication Data
US 2019/0306220 A1    Oct. 3, 2019

(51) Int. Cl.
| | |
|---|---|
| *H04L 29/06* | (2006.01) |
| *H04N 19/146* | (2014.01) |
| *H04N 19/166* | (2014.01) |

(52) U.S. Cl.
CPC ........ *H04L 65/608* (2013.01); *H04L 65/4092* (2013.01); *H04L 65/601* (2013.01); *H04L 65/607* (2013.01); *H04L 65/80* (2013.01); *H04N 19/146* (2014.11); *H04N 19/166* (2014.11)

(58) Field of Classification Search
CPC .... H04L 65/604; H04L 65/607; H04N 19/146
See application file for complete search history.

(56) References Cited

U.S. PATENT DOCUMENTS

| | | | | |
|---|---|---|---|---|
| 5,231,484 A | * | 7/1993 | Gonzales | H04N 19/00 375/240.04 |
| 5,886,742 A | * | 3/1999 | Hibi | G06T 9/008 348/699 |
| 6,018,611 A | * | 1/2000 | Nogami | G11B 5/09 386/284 |
| 6,088,392 A | * | 7/2000 | Rosenberg | H04N 19/176 375/240.03 |
| 6,937,168 B2 | * | 8/2005 | Rao | H04N 5/76 341/50 |
| 7,143,432 B1 | | 11/2006 | Brooks et al. | |
| 7,317,837 B2 | * | 1/2008 | Yatabe | H04N 19/197 375/E7.088 |
| 9,106,887 B1 | * | 8/2015 | Owen | H04N 19/102 |

(Continued)

*Primary Examiner* — Lashonda T Jacobs
(74) *Attorney, Agent, or Firm* — Boyle Fredrickson S.C.

(57) ABSTRACT

In an electronic video monitoring system for security and surveillance, a recording device can adaptively change a bit rate at which a video stream is transmitted so that image quality is prioritized, including above maintaining a continuous real-time transmission. In this way, image quality suitable for security and surveillance can be guaranteed close to real-time, despite changes in video transmission requirements and/or network demands. In one aspect, a frame rate can be lowered to no less than a minimum frame rate, a resolution can be lowered to no less than a minimum resolution, and the frame rate and resolution can be lowered to the minimum frame rate and the minimum resolution, respectively, before allowing an increase of compression of the video stream in view of the change in video transmission requirements and/or network demands. This allows sustaining image quality suitable for security and surveillance.

20 Claims, 5 Drawing Sheets

(56) References Cited

U.S. PATENT DOCUMENTS

| | | | |
|---|---|---|---|
| 9,230,250 B1* | 1/2016 | Parker | G06Q 20/203 |
| 9,578,342 B2 | 2/2017 | Yang et al. | |
| 9,609,332 B2* | 3/2017 | Owen | H04N 19/102 |
| 9,892,606 B2* | 2/2018 | Venetianer | G06K 9/00771 |
| 9,936,208 B1* | 4/2018 | Brailovskiy | H04N 19/42 |
| 9,955,195 B2* | 4/2018 | Soroushian | H04N 21/234372 |
| 10,257,528 B2* | 4/2019 | Jeong | H04N 19/31 |
| 2002/0163577 A1* | 11/2002 | Myers | G08B 13/19643 |
| | | | 348/152 |
| 2003/0112347 A1* | 6/2003 | Wyman | H04N 5/772 |
| | | | 348/231.99 |
| 2004/0218099 A1* | 11/2004 | Washington | H04N 5/77 |
| | | | 348/571 |
| 2005/0002453 A1 | 1/2005 | Chang et al. | |
| 2007/0024706 A1* | 2/2007 | Brannon, Jr. | H04N 7/17318 |
| | | | 348/142 |
| 2007/0024707 A1* | 2/2007 | Brodsky | G08B 13/1961 |
| | | | 348/143 |
| 2009/0021583 A1* | 1/2009 | Salgar | H04N 7/181 |
| | | | 348/159 |
| 2010/0050221 A1* | 2/2010 | McCutchen | H04N 7/165 |
| | | | 725/109 |
| 2010/0141763 A1* | 6/2010 | Itoh | G06K 9/00771 |
| | | | 348/143 |
| 2010/0245582 A1* | 9/2010 | Harel | G08B 13/1672 |
| | | | 348/159 |
| 2011/0051808 A1* | 3/2011 | Quast | H04N 7/18 |
| | | | 375/240.08 |
| 2011/0164679 A1* | 7/2011 | Satou | H04N 19/172 |
| | | | 375/240.03 |
| 2012/0169883 A1* | 7/2012 | Chang | H04N 7/181 |
| | | | 348/159 |
| 2012/0288165 A1* | 11/2012 | Bedros | G06K 9/00221 |
| | | | 382/118 |
| 2013/0286227 A1* | 10/2013 | Lau | G06F 3/005 |
| | | | 348/207.1 |
| 2016/0014418 A1* | 1/2016 | Shao | H04N 19/149 |
| | | | 375/240.02 |
| 2016/0134842 A1* | 5/2016 | Cha | G08B 13/22 |
| | | | 348/143 |
| 2016/0173805 A1* | 6/2016 | Claus | H04N 17/004 |
| | | | 348/148 |
| 2016/0295250 A1 | 10/2016 | Yang et al. | |
| 2017/0104804 A1* | 4/2017 | Do | H04L 65/602 |
| 2017/0171271 A1 | 6/2017 | Kelly et al. | |
| 2017/0208328 A1 | 7/2017 | Kuusela | |
| 2018/0146121 A1* | 5/2018 | Hensler | G06T 7/174 |
| 2018/0270521 A1* | 9/2018 | Lindgren | H04L 65/60 |
| 2018/0332218 A1* | 11/2018 | Yoshimura | H04N 5/23232 |

\* cited by examiner

SYSTEM FOR VIDEO MONITORING WITH ADAPTIVE BITRATE TO SUSTAIN IMAGE QUALITY

BACKGROUND OF THE INVENTION

1. Field of the Invention

The present invention relates to an improved electronic video monitoring system, and more particularly, to an electronic video monitoring system which monitors for events requiring changes in data transfer rates for transmitting encoded media streams and, in response to such events, prioritizes image quality in the encoded media stream in changing the data transfer rates.

2. Discussion of the Related Art

Cameras have long been used as part of monitoring and/or surveillance systems. More recently, cameras have been coupled with electronic sensors to detect triggering events, such as a detected motion, to allow recording of an area after a triggering event has occurred. Such cameras have also been wirelessly connected to computers with network access to allow users to remotely monitor areas with electronic devices such as a smart phones and tablet computers. In these systems, real-time or live monitoring of events is possible with the benefit of high speed network connections.

However, changes in video transmission requirements and/or network demands, such as increased motion in the video stream, or congestion and/or interference in the network, respectively, can make reliable video monitoring a challenge. It is therefore desirable to provide a system that is better-suited for security and surveillance which enables video monitoring while mitigating one or more of the foregoing disadvantages.

SUMMARY OF THE INVENTION

In an electronic video monitoring system for security and surveillance, a recording device can adaptively change a bit rate at which a video stream is transmitted so that image quality is prioritized, including above maintaining a continuous real-time transmission. In this way, image quality suitable for security and surveillance can be better-assured in or close to real-time, despite changes in video transmission requirements and/or network demands. In one aspect, a frame rate can be lowered to no less than a minimum frame rate, a resolution can be lowered to no less than a minimum resolution, and/or the frame rate and resolution can be lowered to the minimum frame rate and the minimum resolution, respectively, before allowing an increase of compression of the video stream in view of the change in video transmission requirements and/or network demands. This adjustment allows sustaining image quality suitable for security and surveillance.

The present inventors have recognized that a video stream more ideal for security and surveillance which largely sustains image quality for a more detailed field of view, despite changes in video transmission requirements and/or network demands, can be provided by prioritizing frame rate and/or resolution above increases in compression and by allowing the video stream to be transmitted close to real-time. While providing a continuous media stream in real-time is desirable, the present invention prioritizes image quality above providing a continuous media stream in real-time. Moreover, the present inventors have recognized that reductions in frame rate alone can provide a substantial improvement for sustained image quality while adaptively meeting such changes in video transmission requirements and/or network demands.

In one aspect, the device (or application executing on the device) can set a target maximum data rate. In the event of congestion or interference in the channel(s) and/or feedback from a receiver: the device can lower the video frame rate to maintain maximum data rate. In addition, the device can lower resolution, still resulting in favorable image quality instead of compression. However, if maintaining a data rate transmission continues to struggle, the device can then compress the data for transmission.

The device could be a streaming security camera configured to operate either from a mains power source or from an independent power source such as a battery and/or solar array, and to communicate wirelessly, such as through a Wi-Fi and/or cellular communications network.

A frame rate adjustment can occur due to factors such as, but not limited to: high motion which could cause, for example, a reduction in a quantization (a lossy compression technique achieved by compressing a range of values to a single quantum value, which may be controlled by a quantization parameter (QP)), thereby increasing bitrate; and/or upstream bandwidth saturation/congestion, even without high motion. In the case of high motion, bitrate cannot be infinitely increased, so in order to maintain less compression without significant increase in data rate, the frame rate can be dropped. In the case of upstream bandwidth saturation/congestion, instead of compressing right away, the system can first lower the frame rate or resolution, which may reduce the average number of "P-frames" between "I-frames, thereby lowering a total number of bits per second to transmit without increasing compression." "I-frames" in this regard are intra-coded pictures (frames that do not require other frames to decode) and "P-frames" are predictive coded pictures (frames that require prior decoding of an I-frame in order to decode). If the bandwidth still cannot sustain the lower frame rate or resolution, the device can apply greater compression.

Specifically then, one aspect of the present invention can provide a system for video monitoring, including: a recording device configured to capture video images at a resolution and frame rate, process the video images to produce an encoded media stream, and transmit the encoded media stream through a network connection. The recording device can have a processor executing a program stored in a non-transient medium to: monitor for an event requiring a change in data transfer rate for transmitting the encoded media stream; and in response to the event, prioritize image quality in the encoded media stream in changing the data transfer rate by adjusting at least one of the frame rate and the resolution before adjusting compression of the encoded media stream, wherein the recording device maintains at least a minimum frame rate and a minimum resolution to sustain image quality.

Another aspect of the invention can provide a method for video monitoring using a recording device for capturing video images at a resolution and frame rate, processing the video images to produce an encoded media stream, and transmitting the encoded media stream through a network connection, the method including: monitoring for an event requiring a change in data transfer rate for transmitting the encoded media stream; and in response to the event, prioritizing image quality in the encoded media stream in changing the data transfer rate by adjusting at least one of the frame rate and the resolution before adjusting compression of the encoded media stream, wherein the recording device maintains at least a minimum frame rate and a minimum resolution to sustain image quality.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
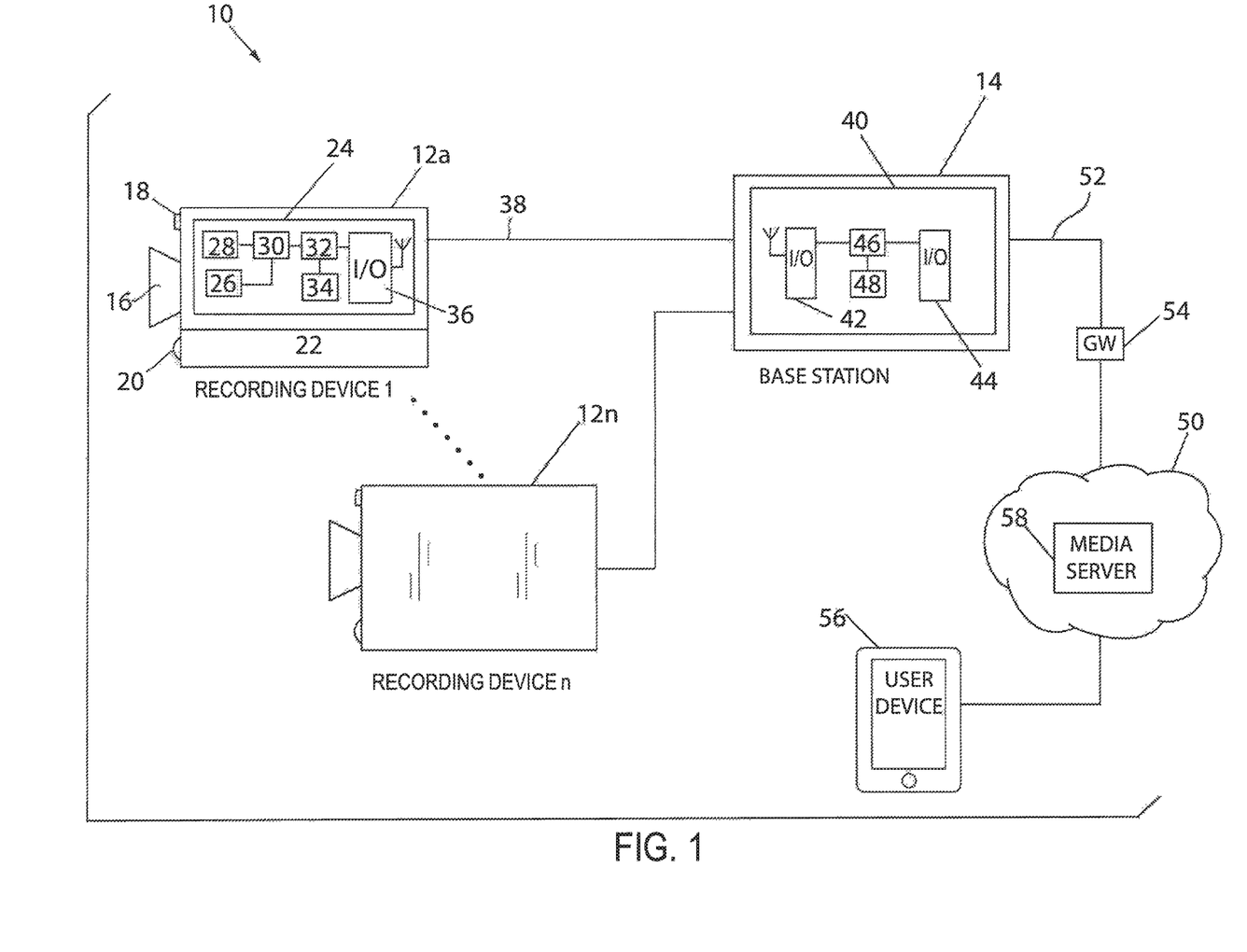
FIG. 1 is a schematic representation of a system for video monitoring, including multiple recording devices in communication with a base station, in accordance with an aspect of the invention.

Referring now to FIG. 1, in accordance with an aspect of the invention, an electronic system for video monitoring 10, usable for example for security and surveillance, can include multiple recording devices 12, such as a first recording device 12a through a last recording device 12n, in communication with a base station 14. Each recording device 12 could be a wired or wireless digital video recording device including a camera 16, a microphone 18, visible and/or infrared (IR) lights 20, a power supply 22 and/or recording device electronic circuitry 24, including an imager 26, audio circuit 28, media encoder 30, processor 32, non-transient memory storage 34 and/or I/O communication device 36, among other things. It should be apparent that "circuitry" in the regard can comprise hardware, firmware, software, or any combination thereof. Each recording device 12 can be in communication with the base station 14 through a network such as a private network connection 38, hosted by the base station 14 operating as an access point. Although the network connection 38 could be a wired network connection, such as an IEEE 802.3 Local Area Network (LAN) connection, the network connection 38 of this embodiment is a wireless network connection, such as an IEEE 802.11 Local Area Network (LAN) Wi-Fi connection.

The base station 14 can include base station electronic circuitry 40, including a first (wired or wireless) I/O communication device 42 for communicating with the recording devices 12 over network connections 38, a second (wired or wireless) I/O communication device 44 for accessing a Wide Area Network (WAN) 50, such as the Internet through Local Area Network (LAN) 52 connected to a Gateway and/or Router 54, a processor 46 and/or a non-transient memory storage 48, among other things. In one aspect, the recording devices 12 could be Arlo cameras, and the base station 14 could be an Arlo base station, each as part of an Arlo Smart Security System as available from Netgear, Inc. of San Jose, Calif.

In operation, each recording device 12 can be configured though suitable mounting of the recording device 12 and/or through suitable manipulation of its controls, to monitor an area of interest or field of view, such as a part of a building or section of property. When a recording device 12 is commanded by a user-operated device, such as a smart phone, tablet, laptop, PC or other user's device 56 communicating with the base station 14 through the WAN 50, and/or when a recording device 12 independently detects motion and/or sound, the recording device 12 can video and/or audio ("media") stream motion and/or sound captured in real-time back to the base station 14 and ultimately the user's device 56 for viewing in real-time or close to real-time. As used herein, real-time refers to live video streaming with minimal latencies which may be compatible with the Internet Protocol (IP) suite, including the Real-time Transport Protocol (RTP) and Real Time Streaming Protocol (RTSP), whose specifications are well known. Close to real-time refers to streaming with latencies greater than real-time but still be minimal, such as on the order of seconds or minutes within video capture.

In particular, the processor 32 of a recording device 12 can execute a program stored in the non-transient memory storage 34 to respond to a command from a user and/or independently detect motion and/or sound. The camera 16 can then capture video images at a resolution and frame rate in a raw video stream which, in turn, can be provided to the media encoder 30 for producing video packets in an encoded video stream. Similarly, the microphone 18 and the audio circuit 28 can capture sound in a raw audio stream which, in turn, can be provided to the media encoder 30 for producing audio packets in an encoded audio stream. Accordingly, the video and/or audio packets, referred to herein as "media" packets, are provided in an encoded media stream. Each media packet can include a sequence number indicating a relative order of the media packet in the encoded media stream for subsequent streaming. As configured, under control of the processor 32 executing the program, the encoded media stream can be transmitted from the I/O communication device 36 to the base station 14.

The media encoder 30 can use RTP to produce the media packets as RTP packets. In one aspect, the media encoder 30 can prepare the encoded media stream using H.264, a well-known block-oriented motion-compensation-based video compression standard. Also, in delivering the encoded media stream, the recording device 12 can operate as a server according to RTSP, a network control protocol designed for use in entertainment and communications systems to control streaming media servers. Each recording device 12 can transmit media packets to the base station 14 over a dedicated User Datagram Protocol (UDP) connection (implemented with respect to the network connection 38) between the recording device 12 and the base station 14.

The processor 46 of the base station 14 can execute a program stored in the non-transient memory storage 48 to receive the media packets from the recording device 12 in the encoded media stream, correct the encoded media stream, and send the corrected encoded media stream to a media server 58 hosted in the WAN 50. In receiving the encoded media stream from the recording device 12, the base station 14 can operate as an RTSP client of the recording device 12. In addition, in delivering the corrected encoded media stream to the media server 58, the base station 14 can operate as an RTSP client to the media server 58, pushing content to the media server 58. The media server 58, in turn, can operate as an RTSP server for the user's device 56 to provide real-time streaming to the user.

Figure 2:
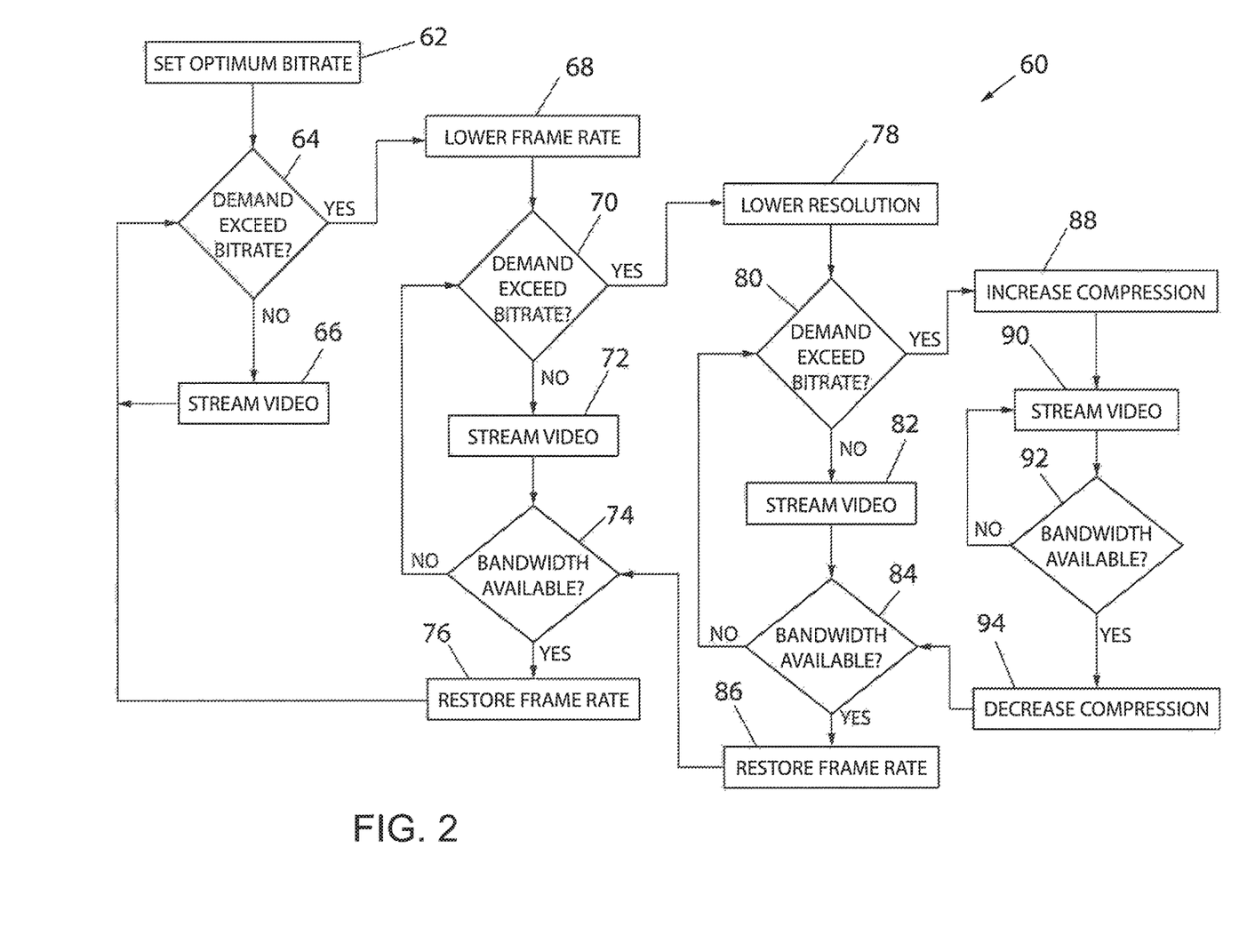
FIG. 2 is a flow diagram illustrating control of an exemplary recording device configured to adaptively change a data transfer rate for transmitting an encoded media stream to the base station of FIG. 1.

Referring now to FIG. 2, a flow diagram 60 illustrating control of an exemplar recording device 12 configured to adaptively change a data transfer rate for transmitting an encoded media stream to the base station 14 is provided in accordance with an aspect of the invention. The recording device 12 can implement the flow diagram 60, for example, by the processor 32 executing a program stored in the non-transient memory storage 34 and/or implementation of electronic circuitry. Beginning at step 62, the recording device 12 can capture video images at an optimum resolution and frame rate for the system in a raw media stream from the camera 16. The recording device 12 can similarly capture sound from the microphone 18 and the audio circuit 28. In one aspect, the video images could be captured at an optimum resolution of 3840×2160 pixels (also known as 2160p or 4K HD) or 1920×1080 pixels (also known as 1080p or full HD) and at an optimum frame rate of 24 or 30 frames per second (fps). The video images can then be processed to produce an encoded media stream for transmission at an optimum data transfer rate (also known as a. "bit rate") for the system through the network connection 38. By way of example, the network connection 38 could be an IEEE 802.11b connection having an actual bandwidth of about 5.5 Megabits per second (Mbps). Accordingly, in one aspect, the encoded media stream could be configured for transmission at the heightened frame rate and resolution through the IEEE 802.11b connection at an optimum data transfer rate of about 1.5 Mbps. This could reflect a condition of little motion being captured in the video images and/or little network activity.

At decision step 64, the recording device 12 can monitor for an event requiring a change in the data transfer rate for transmitting the encoded media stream. Events requiring a change in the data transfer rate could be an updated demand in video transmission requirements, such as increased motion captured in the video stream causing an increase in size of the encoded media stream, thereby requiring an increase in the data transfer rate; and/or a network demand, such as an increase in network activity due to congestion and/or interference in the network by other devices or the environment, thereby requiring a decrease in the data transfer rate to accommodate the increase in network activity. Such events can be detected by the recording device 12, for example, by monitoring status of the media encoder 30 and/or a transmission status of the encoded media stream, such as by monitoring a depth of an egress queue for storing outbound RTP media packets of the encoded media stream. Such events can also be detected by another device, such as the base station 14, which could be monitoring network traffic and statistics, and which, in turn, could provide periodic reports to the recording device 12 for the event monitoring.

If at decision step 64 the optimum data transfer rate can be accommodated, and current demands in the system (such as video transmission requirements and/or network demands) do not exceed a threshold requiring a reduction in the data transfer rate ("No"), the recording device 12 can continue to step 66 in which the encoded media stream is transmitted at the optimum data transfer rate. The recording device 12 can then return to decision step 64, continuously in a loop, monitoring for events requiring a change in the data transfer rate, while transmitting the encoded media stream at the optimum data transfer rate, so long as an event does not occur.

However, if at decision step 64 the recording device 12 determines occurrence of an event requiring a change in the data transfer rate ("Yes"), in response to the event, the recording device 12 can instead proceed to step 68. At step 68, the recording device 12 prioritizes image quality in the encoded media stream in changing the data transfer rate by first adjusting the frame rate or the resolution. In particular, the present inventors have recognized that reductions in frame rate alone can provide a substantial improvement for sustained image quality while adaptively meeting such changes in video transmission requirements and/or network demands. As shown in FIG. 2, at step 68, the recording device 12 first lowers the frame rate of the captured video images, such as from 30 fps to 15 fps, or from 24 fps to 12 fps. The reduction in frame rate decreases the size of the encoded media stream thereby allowing a decrease in the data transfer rate. This may reduce the average number of P-frames between I-frames, thereby lowering a total number of bits per second to transmit. In another aspect, the recording device 12 could first lower the resolution of the captured video images instead.

Next, at decision step 70, the recording device 12 can determine whether the demand requires a further reduction in the data transfer rate (or if the present reduction in frame rate satisfies the event). If the present reduction in frame rate satisfies the event, and the demand does not require a further reduction in the data transfer rate ("No"), the recording device 12 can continue to step 72 in which the encoded media stream is transmitted at a decreased data transfer rate based on the lowered frame rate. Then, at decision step 74, the recording device 12 can periodically determine whether the demand has been reduced, such as the event requiring the change in the data transfer rate having ended, with bandwidth becoming available. If at decision step 74 the recording device 12 determines that the demand has not been satisfied ("No"), the recording device 12 can return to decision step 70, continuously in a loop, determining whether the demand requires a further reduction in the data transfer rate, and transmitting the encoded media stream at the at the decreased data transfer rate based on the lowered frame rate. However, if at decision step 74 the recording device 12 determines that the demand has been satisfied, and bandwidth is again available ("Yes"), the recording device 12 can restore the frame rate to the optimum setting at step 76, and return to decision step 64, executing continuously in the previously loop, transmitting the encoded media stream at the optimum data transfer rate, monitoring for an event requiring a change in the data transfer rate.

However, if at decision step 70 the recording device 12 determines that the present reduction in frame rate does not satisfy the event, and the demand requires a further reduction in the data transfer rate ("Yes"), the recording device 12 can take additional action. In one aspect, the recording device 12 can lower the frame rate again and repeat steps 72 and 74. This could occur through multiple levels of frame rate reductions until a minimum frame rate, such as 12 fps or higher, is reached.

However, in another aspect, the recording device 12 can continue to step 78. At step 78, the recording device 12 continues to prioritize image quality in the encoded media stream in changing the data transfer rate by next adjusting the resolution For example, the recording device 12 can lower the resolution of the captured video images from 2160p to 1080p, or from 1080p to a minimum resolution of, for example, 1280×720 pixels (also known as 720p or HD ready). The reduction in resolution further decreases the size of the encoded media stream thereby allowing a further decrease in the data transfer rate.

Next, at decision step 80, the recording device 12 can determine whether the demand requires a further reduction in the data transfer rate (or if the present reductions in frame rate and resolution satisfy the event). If the present reductions in frame rate and resolution satisfy the event, and the demand does not require a further reduction in the data transfer rate ("No"), the recording device 12 can continue to step 82 in which the encoded media stream is transmitted at a decreased data transfer rate based on the lowered frame rate and resolution. Then, at decision step 84, the recording device 12 can periodically determine whether the demand has been reduced, such as the event requiring the change in the data transfer rate having ended, with bandwidth becoming available. If at decision step $4 the recording device 12 determines that the demand has not been satisfied ("No"), the recording device 12 can return to decision step 80, continuously in a loop, determining whether the demand requires a further reduction in the data transfer rate, and transmitting the encoded media stream at the at the decreased data transfer rate based on the lowered frame rate and resolution. However, if at decision step 84 the recording device 12 determines that the demand has been satisfied, and bandwidth is again available ("Yes"), the recording device 12 can restore the resolution to the optimum setting at step 86 and return to decision step 74 to further determine whether sufficient bandwidth is again available for further restoring the frame rate.

However, if at decision step 80 the recording device 12 determines that the present reduction in resolution does not satisfy the event, and the demand requires a further reduction in the data transfer rate ("Yes"), the recording device 12 can take additional action. In one aspect, the recording device 12 can lower the resolution again and repeat steps 82 and 84. This could occur through multiple levels of resolution reductions until a minimum resolution, such as 720p, is reached. Alternatively, the recording device 12 can return to step 68 to further lower the frame rate so long as the minimum frame rate has not been reached. Accordingly, the recording device 12 could cycle between steps 68 and 70, incrementally lowering frame rate followed by resolution, until minimum values for each have been reached.

However, in another aspect, the recording device 12 can continue to step 88. At step 88, in response to the event having prioritized image quality in the encoded media stream in changing the data transfer rate by adjusting the frame rate and the resolution, and still further requiring a reduction in the data transfer rate, the recording device 12 can resort to an increase in compression of the encoded media stream. This can be accomplished by adjusting the media encoder 30 to further compress the captured video images in producing the encoded media stream, thereby decreasing the size of the encoded media stream and, in turn, decreasing the necessary data transfer rate for the encoded media stream. In one aspect, increasing compression of the encoded media stream can limit the data transfer rate to 50 Kilobits per second (Kbps).

With such compression, the recording device 12 can continue to step 90 in which the encoded media stream is transmitted at a substantially decreased data transfer rate. Then, at decision step 92, the recording device 12 can periodically determine whether the demand has been reduced, such as the event requiring the change in the data transfer rate having ended, with bandwidth becoming available. If at decision step 92 the recording device 12 determines that the demand has not been satisfied ("No"), the recording device 12 can return to step 90, continuously in a loop, transmitting the encoded media stream at the at the substantially decreased data transfer rate, and determining whether the demand has been reduced. However, if at decision step 92 the recording device 12 determines that the demand has been satisfied, and bandwidth is again available ("Yes"), the recording device 12 can decrease the additional application of compression at step 94 and return to decision step 84 to further determine whether sufficient bandwidth is again available for further restoring the resolution. In one aspect, the recording device 12 could additionally vary amounts of compression, incrementally applying more compression according to the demand, until a maximum compression is reached.

Figure 3:
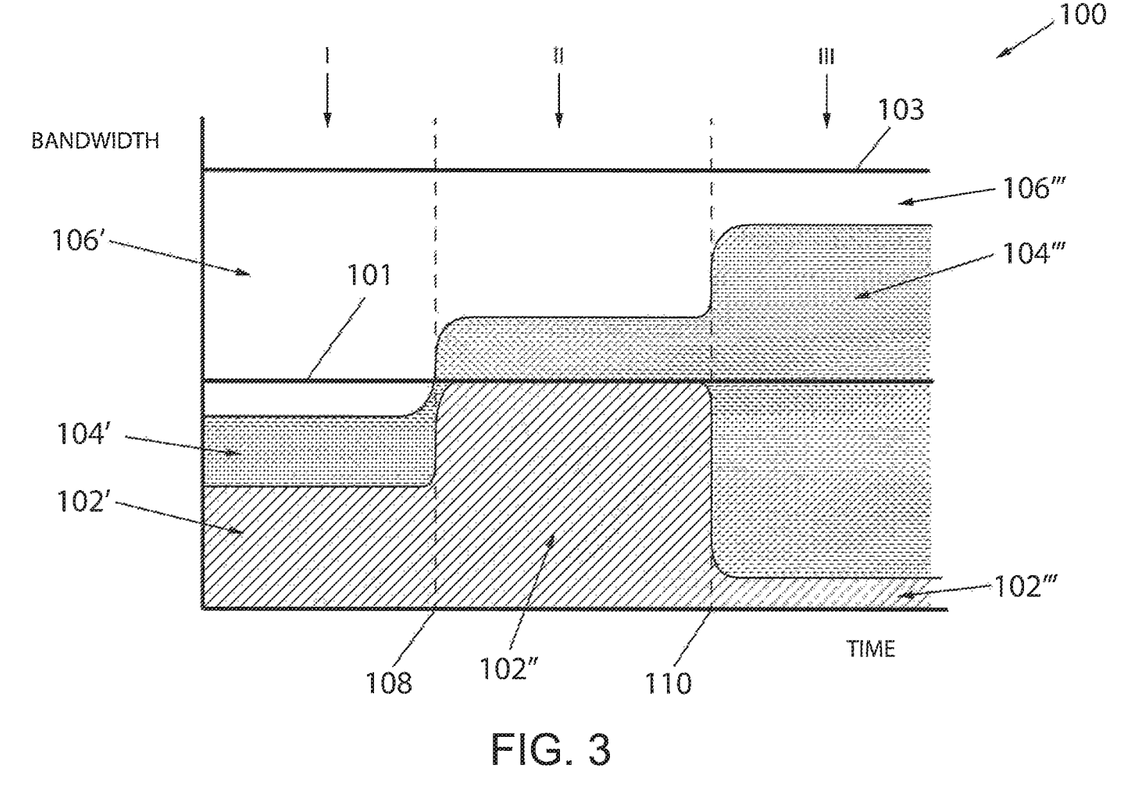
FIG. 3 is an exemplary diagram showing the data transfer rate for the encoded media stream of FIGS. 1 and 2 adaptively changing due to a change in video transmission requirements, such as an increase in motion requiring an increase in the data transfer rate, followed by a change in network demands, such as an increase in network activity requiring a decrease in the data transfer rate, in accordance with an aspect of the invention.

By way of example, with additional reference to FIG. 3, a diagram 100 illustrates a data transfer rate 102 for the encoded media stream of FIGS. 1 and 2 adaptively changing due to a change in video transmission requirements followed by a change in network demands. The network connection 38 could have an approximate limited bandwidth 103, such as about 5.5 Mbps for an IEEE 802.11b. The recording device 12 can determine a maximum data transfer rate 101, such as 2.5 Mbps, for transmitting the encoded media stream. The maximum data transfer rate may be determined based on the maximum bandwidth of the network connection 38 and an allocation of guard band for congestion and/or interference on the network. The maximum data transfer rate could be statically assigned and/or dynamically adjustable, such as according to devices joining the network and/or predicted interference.

During a first time period "I," the recording device 12 can transmit the encoded media stream, with minimal video compression, at an optimum resolution and frame rate, at a first data transfer rate 102' through the network connection 38, such as at 1.5 Mbps, below the maximum data transfer rate 101. Other network activity 104' may exist on the network connection 38, such as congestion and/or interference in the network caused by other devices or the environment, leaving some amount of available network bandwidth 106'. Then, at a first instance 108, the recording device 12 can detect a first event requiring a change in the data transfer rate for transmitting the encoded media stream. The first event could be an increase in size of the encoded media stream caused by an increase in motion captured in the video images. The increase in size could require an increase in the data transfer rate. However, to avoid exceeding the maximum data transfer rate 101, the recording device can lower the frame rate. Accordingly, during a second time period "II," the recording device 12 can lower the frame rate to transmit the encoded media stream, with minimal video compression and optimum resolution, at a second data transfer rate 102", such as 2.5 Mbps. As a result, the increase in size of the encoded media stream is accommodated, but still at or below the maximum data transfer rate 101 with sustained image quality.

Then, at a second instance 110, the recording device 12 can detect a second event requiring a second change in the data transfer rate for transmitting the encoded media stream. The second event could be a substantial increase in network activity 104''', such as greater congestion and/or interference, other devices joining the network, and so forth, requiring a substantial decrease in the data transfer rate. Accordingly, during a third time period "III," with lowering the frame rate and lowering the resolution being insufficient to leave any available network bandwidth 106''', the recording device 12 can resort to an increase in compression of the encoded media stream to substantially lower the data transfer rate 102 to a third data transfer rate 102''', such as to 50 Kbps.

Figure 4:
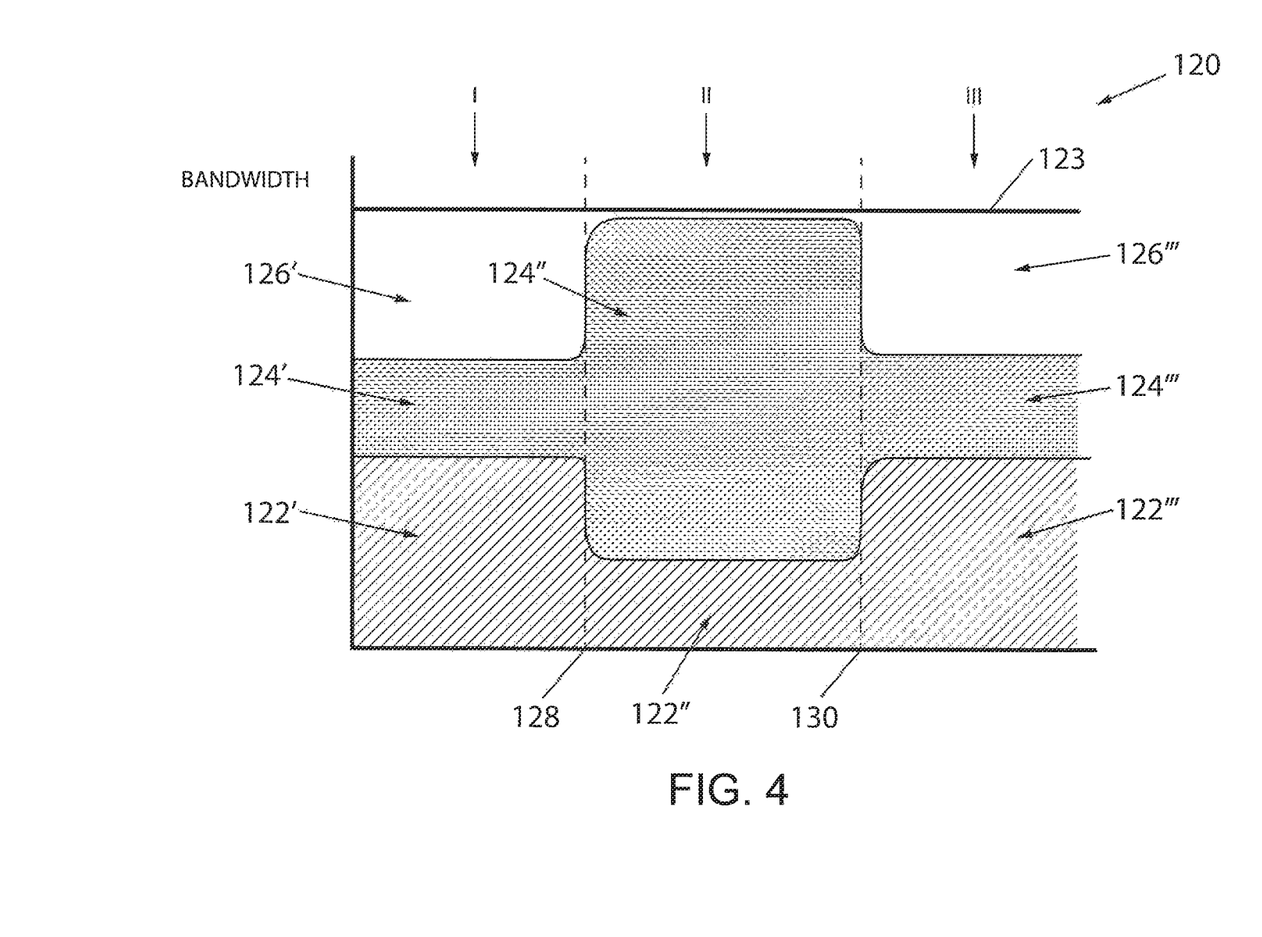
FIG. 4 is an exemplary diagram showing the data transfer rate for the encoded media stream of FIGS. 1 and 2 adaptively changing due to a first change in network demands, such as an increase in network activity requiring a decrease in the data transfer rate, followed by a second change in network demands, such as a decrease in network activity allowing an increase in the data transfer rate, in accordance with an aspect of the invention.

As another example, with additional reference to FIG. 4, a diagram 120 illustrates a data transfer rate 122 for the encoded media stream of FIGS. 1 and 2 adaptively changing due to an increase in network demands followed by a decrease in network demands. Similarly, the network connection 38 could have an approximate limited bandwidth 123, such as about 5.5 Mbps for an IEEE 802.11b. Also, other network activity 124' may exist on the network connection 38, such as congestion and/or interference in the network caused by other devices or the environment, leaving some amount of available network bandwidth 126'.

During a first time period "I," the recording device 12 can transmit the encoded media stream, with minimal video compression, at an optimum resolution and frame rate, at a first data transfer rate 122' through the network connection 38, such as at 1.5 Mbps. Other network activity 124' may exist on the network connection 38. Then, at a first instance 128, the recording device 12 can detect a first event requiring a change in the data transfer rate for transmitting the encoded media stream. The first event could be an increase in network activity 124" on the network connection 38. The increase in network activity 124" could require a decrease in the data transfer rate to accommodate the activity. Accordingly, during a second time period "II," the recording device 12 can lower the frame rate to transmit the encoded media stream, with minimal video compression and optimum resolution, at a second data transfer rate 122", such as 2.5 Mbps. As a result, the increase in network activity is accommodated with sustained image quality.

Then, at a second instance 130, the recording device 12 can detect a second event requiring a second change in the data transfer rate for transmitting the encoded media stream. The second event could be a decrease in network activity 124''', such as a reduction of the congestion and/or interference, other devices leaving the network, and so forth, allowing an increase in the data transfer rate. Accordingly, during a third time period "III," the lowered frame rate can be restored to the optimum frame rate, while leaving sufficient available network bandwidth 126'''.

Figure 5:
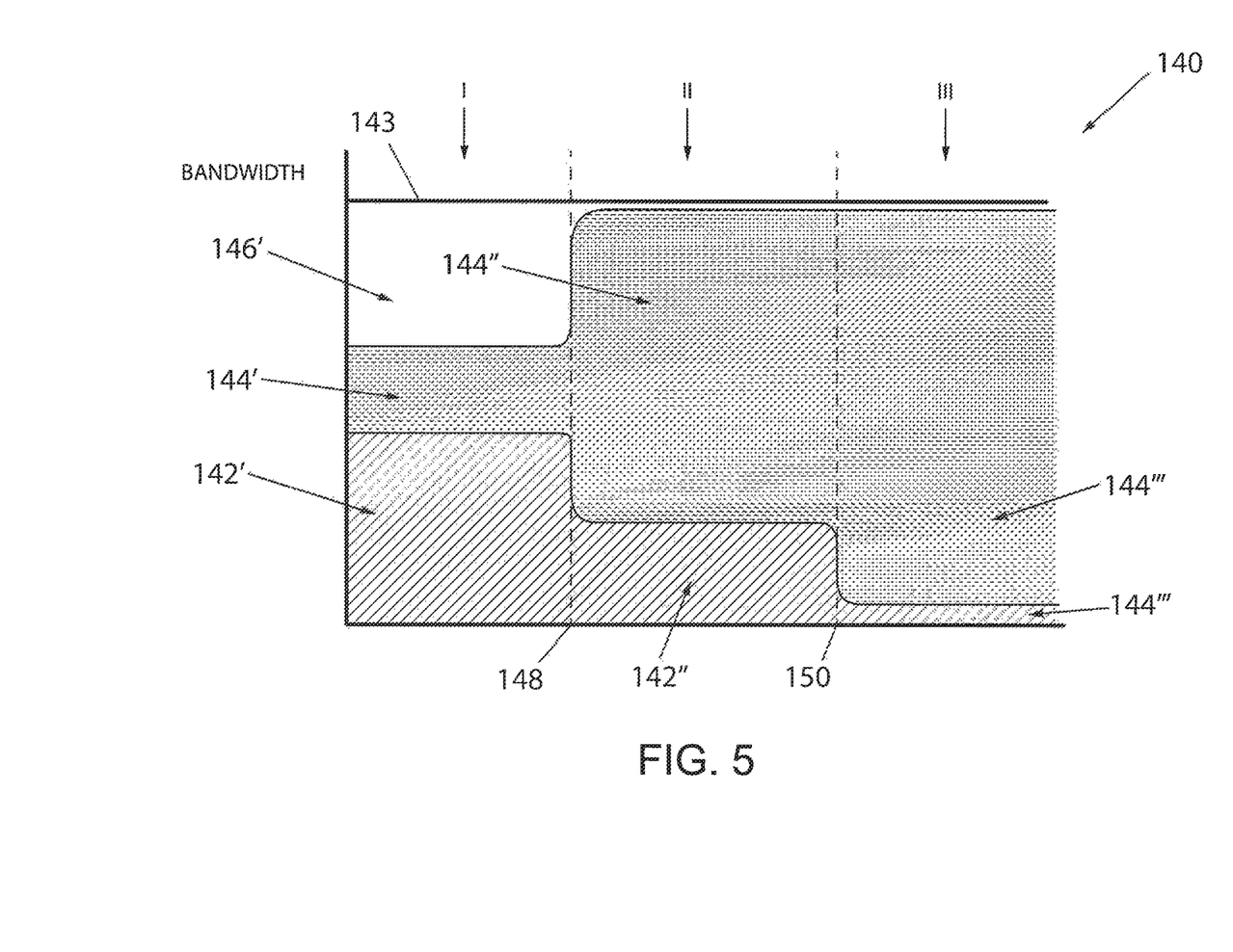
FIG. 5 is an exemplary diagram showing the data transfer rate for the encoded media stream of FIGS. 1 and 2 adaptively changing due to a first change in network demands, such as a first increase in network activity requiring a first decrease in the data transfer rate, followed by a second change in network demands, such as a second increase in network activity requiring a second decrease in the data transfer rate, in accordance with an aspect of the invention.

As yet another example, with additional reference to FIG. 5, a diagram 140 illustrates a data transfer rate 142 for the encoded media stream of FIGS. 1 and 2 adaptively changing due to successive increases in network demands. Similarly, the network connection 38 could have an approximate limited bandwidth 143, such as about 5.5 Mbps for an IEEE 802.11b. Also, other network activity 144' may exist on the network connection 38, such as congestion and/or interference in the network caused by other devices or the environment, leaving some amount of available network bandwidth 146'.

During a first time period "I," the recording device 12 can transmit the encoded media stream, with minimal video compression, at an optimum resolution and frame rate, at a first data transfer rate 142' through the network connection 38, such as at 1.5 Mbps. Other network activity 124' may exist on the network connection 38. Then, at a first instance 148, the recording device 12 can detect a first event requiring a change in the data transfer rate for transmitting the encoded media stream. The first event could be an increase in network activity 144" on the network connection 38. The increase in network activity 144" could require a decrease in the data transfer rate to accommodate the activity. Accordingly, during a second time period "II," the recording device 12 can lower the frame rate to transmit the encoded media stream, with minimal video compression and optimum resolution, at a second data transfer rate 142", such as 2.5 Mbps. As a result, the increase in network activity is accommodated with sustained image quality.

Then, at a second instance 150, the recording device 12 can detect a second event requiring a second change in the data transfer rate for transmitting the encoded media stream. The second event could be a further increase in network activity 144'''. Accordingly, during a third time period "III," with lowering the frame rate and lowering the resolution being insufficient to accommodate the network activity, the recording device 12 can resort an increase in compression of the encoded media stream to substantially lower the data transfer rate 144''', such as to 50 Kbps.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A system for video monitoring, comprising:
a recording device to configured to capture video images at a resolution and frame rate, process the video images to produce an encoded media stream, and transmit the encoded media stream through a network connection, the recording device having a processor executing a program stored in a non-transitory medium to:
monitor for an event requiring a change in data transfer rate for transmitting the encoded media stream; and
in response to the event, prioritize image quality in the encoded media stream in changing the data transfer rate by adjusting at least one of the frame rate and the resolution before adjusting compression of the encoded media stream, wherein the recording device maintains at least a minimum frame rate and a minimum resolution to sustain image quality, and wherein the processor is configured to control the recording device such that the frame rate is lowered to the minimum frame rate and the resolution is lowered to the minimum resolution before allowing an increase of compression of the encoded media stream.

2. The system of claim 1, wherein the event is an increase in size of the encoded media stream caused by an increase in motion captured in the video images, and wherein the processor executes such that the increase in size requires an increase in the data transfer rate.

3. The system of claim 2, wherein the processor further executes to determine a maximum data transfer rate for transmitting the encoded media stream, wherein the processor further executes to lower the at least one of the frame rate and the resolution to prevent the data transfer rate from exceeding the maximum data transfer rate.

4. The system of claim 3, wherein the processor further executes to increase compression of the encoded media stream after lowering the frame rate to the minimum frame rate and lowering the resolution to the minimum resolution to prevent the data transfer rate from exceeding the maximum data transfer rate.

5. The system of claim 4, wherein the maximum data transfer rate is between 2 to 3 Megabits per second (Mbps).

6. The system of claim 1, wherein the event is an increase in network activity on the network connection, and wherein the increase in network activity requires a decrease in the data transfer rate.

7. The system of claim 6, wherein the processor executes to increase compression of the encoded media stream after lowering the frame rate to the minimum frame rate and lowering the resolution to the minimum resolution to accommodate the network activity.

8. The system of claim 7, wherein the processor further executes such that increasing compression of the encoded media stream limits the data transfer rate to at least 50 Kilobits per second (Kbps).

9. The system of claim 7, wherein the processor further executes to restore the at least one of the frame rate and the resolution to increase the data transfer rate after the network activity ceases.

10. The system of claim 1, wherein the minimum frame rate is at least 12 frames per second (fps).

11. The system of claim 1, wherein the minimum resolution is at least 1280×720 pixels.

12. The system of claim 1, wherein the network connection is an IEEE 802.11 Local Area Network (LAN) wireless connection.

13. The system of claim 12, further comprising a base station, wherein the recording device operates as a Real Time Streaming Protocol (RTSP) server and the base station operates as a RTSP client, and wherein the recording device produces the encoded media stream using H.264.

14. A method for video monitoring using a recording device for capturing video images at a resolution and frame rate, processing the video images to produce an encoded media stream, and transmitting the encoded media stream through a network connection, the method comprising:
    monitoring for an event requiring a change in data transfer rate for transmitting the encoded media stream; and
    in response to the event, prioritize image quality in the encoded media stream in changing the data transfer rate by adjusting at least one of the frame rate and the resolution before adjusting compression of the encoded media stream, wherein the recording device maintains at least a minimum frame rate and a minimum resolution to sustain image quality, and wherein the processor is configured to control the recording device such that the frame rate is lowered to the minimum frame rate and the resolution is lowered to the minimum resolution before allowing an increase of compression of the encoded media stream.

15. The method of claim 14, wherein the event is an increase in size of the encoded media stream caused by an increase in motion captured in the video images, and wherein the increase in size requires an increase in the data transfer rate.

16. The method of claim 15, further comprising determining a maximum data transfer rate for transmitting the encoded media stream and lowering the at least one of the frame rate and the resolution to prevent the data transfer rate from exceeding the maximum data transfer rate.

17. The method of claim 16, further comprising increasing compression of the encoded media stream after lowering the frame rate to the minimum frame rate and lowering the resolution to the minimum resolution to prevent the data transfer rate from exceeding the maximum data transfer rate.

18. The method of claim 14, wherein the event is an increase in network activity on the network connection, and wherein the increase in network activity requires a decrease in the data transfer rate.

19. The method of claim 18, further comprising increasing compression of the encoded media stream after lowering the frame rate to the minimum frame rate and lowering the resolution to the minimum resolution to accommodate the network activity.

20. The method of claim 19, further comprising restoring the at least one of the frame rate and the resolution to increase the data transfer rate after the network activity ceases.

* * * * *